United States Patent [19]
Onufreiczuk

[11] 3,780,754
[45] Dec. 25, 1973

[54] FLUIDIC ANGULAR SHAFT POSITION SENSOR

[75] Inventor: Sergie Onufreiczuk, Audubon, Pa.

[73] Assignee: The United States of America as represented by the Secretary of the Navy, Washington, D.C.

[22] Filed: Sept. 1, 1972

[21] Appl. No.: 285,773

[52] U.S. Cl. .................................................. 137/82
[51] Int. Cl. ............................................. F15b 5/00
[58] Field of Search ................... 137/82, 85, 625.63; 73/37, 388 BN; 251/208

[56] References Cited
UNITED STATES PATENTS

| | | | |
|---|---|---|---|
| 3,548,876 | 12/1970 | Viersma | 137/625.63 X |
| 3,216,325 | 11/1965 | Couffer | 137/82 X |
| 2,911,008 | 11/1959 | DuBois | 251/208 X |

*Primary Examiner*—Alan Cohan
*Attorney*—R. S. Sciascia et al.

[57] ABSTRACT

A shaft position indicating system for measuring and indicating the angular position of a shaft. A pair of fixed, diametrically opposite nozzles, connected through fixed orifices to a fluid pressure source, confront a plate rotatingly fixed to the shaft with a noncircular, continuous groove symmetrical about its own axis with its locus displaced from the shaft axis, and having pressure relief holes angularly spaced through the plate at the groove. The position of the groove relative to the nozzles determines a back pressure differential linearly indicative of the angular position of the shaft.

2 Claims, 5 Drawing Figures

PATENTED DEC 25 1973 3,780,754
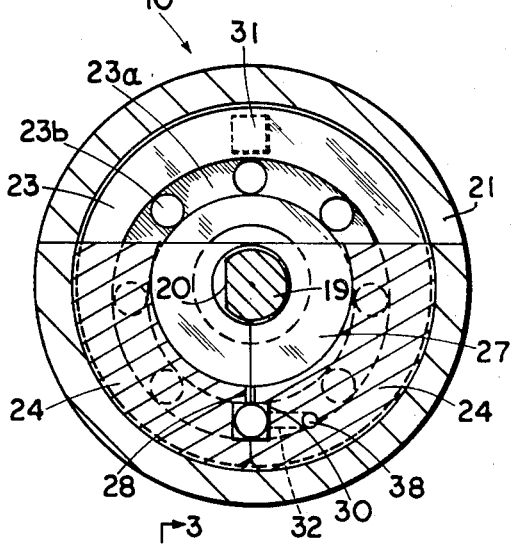
FIG.4
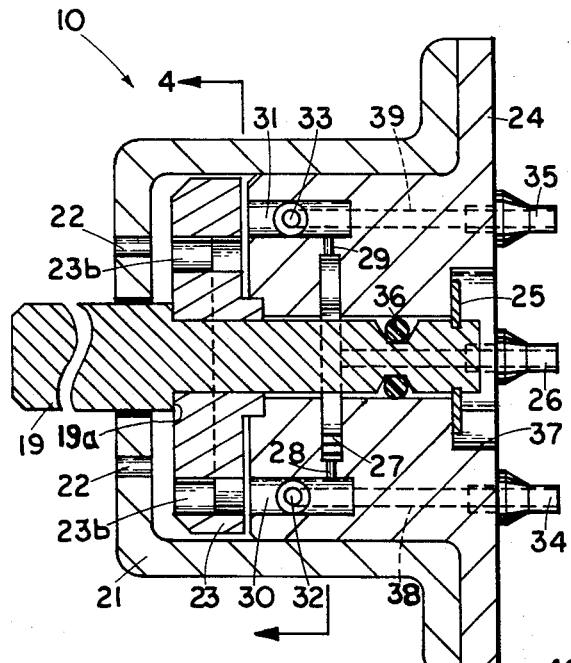
FIG.3
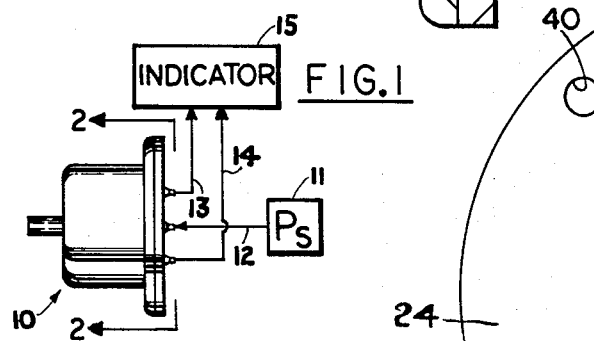
FIG.1
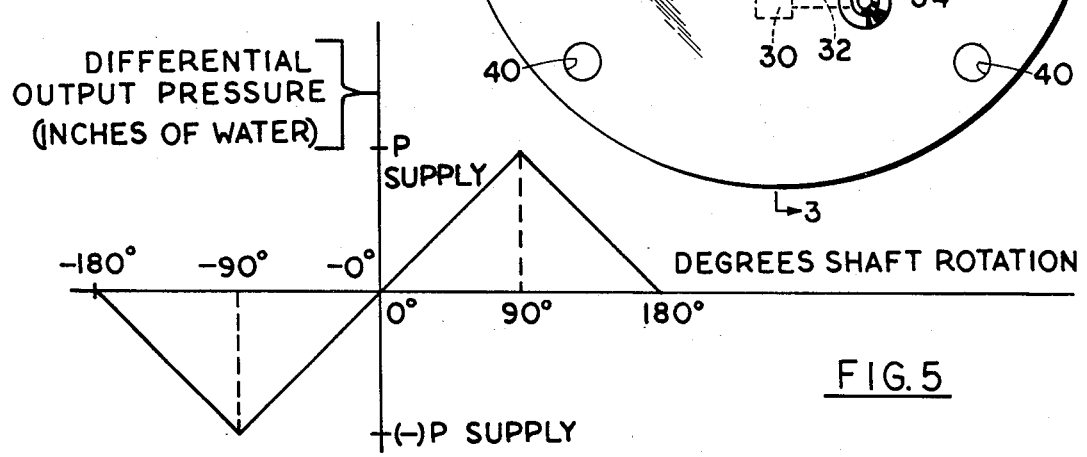
FIG.2
FIG.5

3,780,754

FLUIDIC ANGULAR SHAFT POSITION SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In a fluidic control system, particularly for use in an aircraft, it is necessary to sense angular position of a shaft with a high degree of accuracy for use in a position feedback circuit to control vehicle pitch/yaw and roll rate. Conventional flapper nozzle and yet pipe type fluidic position sensors generally have the disadvantage of a limited linear angular range and are unsuitable for accurate measurement of relatively large angular displacements. The pressure vs. angular position output of these types of devices tend to become nonlinear when the limited range is exceeded causing a loss of resolution in the nonlinear portions of the output curve. Accurate measurement requires uniform resolution over the entire range, a condition which is generally insured by a linear output.

SUMMARY OF THE INVENTION

Accordingly, it is a general purpose and object of the present invention to provide an improved fluidic angular shaft position sensor. It is a further object to provide a sensor which accurately measures angular shaft position over a 360° range. It is yet another object to provide a sensor which produces a linear output over its entire operating range. It is still another object to provide a sensor which produces uniform resolution over its entire operating range.

Briefly these and other objects are accomplished according to the invention by an apparatus including a rotatable shaft, a circular plate rotatingly fixed to the shaft, and a manifold ensheathing a first end of the shaft adjacent the plate. A noncircular, continuous groove on the plate, symmetrical about its own axis with its locus displaced from the shaft axis, and having pressure relief holes angularly spaced through the plate at the groove, registers with a pair of fixed, diametrically opposite nozzles, connected through fixed orifices to a fluid pressure source, to form a variable orifice which is modulated as a function of shaft rotation. The position of the groove relative to the nozzles determines a back pressure differential measured by a suitable indicator such as a manometer linearly indicative of angular shaft position.

BRIEF DESCRIPTION OF THE DRAWINGS

FIG. 1 represents a schematic diagram of a fluidic angular shaft position sensor according to the invention;

FIG. 2 represents a view of the sensor of FIG. 1 taken in the direction of line 2—2;

FIG. 3 represents a view in cross section of the sensor of FIG. 2 taken along line 3—3;

FIG. 4 represents a view in cross section of the sensor of FIG. 3 taken substantially along line 4—4 showing a noncircular, continuous groove relative to a pair of fixed nozzles;

FIG. 5 is a typical graphic representation of differential output pressure vs. degrees shaft rotation indicating operational performance of the sensor of FIG. 1.

DESCRIPTION OF THE PREFERRED EMBODIMENT

Referring now to FIG. 1, in a preferred embodiment a fluidic angular shaft position sensor 10 is connected to a fluid pressure source 11 which supplies sensor 10 with a fluid, compressible or incompressible, through a pressure supply line 12. A pair of output pressure lines 13 and 14 are connected from sensor 10 to a suitable indicator 15 such as a manometer to measure a differential output pressure.

Referring now to FIGS. 2, 3 and 4, sensor 10 includes a rotatable shaft 19 having a flat surface 20 and a shoulder 19a partially housed within a cover 21 having a plurality of vents 22 therethrough to allow trapped fluid pressure to escape to atmosphere. A circular plate 23 is rotatingly fixed to the flat surface 20 of shaft 19 against shoulder 19a. Plate 23 includes a noncircular, continuous groove 23a symmetrical about its own axis with its locus displaced from the shaft axis, and having at least one but preferably more than one pressure relief hole 23b angularly spaced through the plate at the groove.

The depth and shape of groove 23 are critical in order to achieve a linear output. The relationship between pressure and exit orifice area is established with reference to the following equivalent circuit,

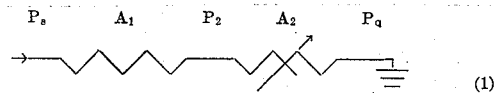

(1)

The hydraulic equation applies at low inlet pressures as follows, $$Q = AC_d\sqrt{2gv\Delta P} \qquad (2)$$

And, $$Q = A_1 C_d \sqrt{2gv(P_s-P_2)} = A_2 C_d \sqrt{2gv(P_2-P_q)} \qquad 3$$

where
$Q$ = Flow rate
$A_1$ = Area of fixed orifice
$A_2$ = Area of variable orifice
$P_s$ = Supply pressure (approximately 1 PSIG)
$C_d$ = Discharge coefficient
$v$ = Specific volume of gas
$P_2$ = Pressure between orifices
$P_q$ = Ambient pressure Assumming that the discharge coefficient is the same at all orifices and that no density changes occur, which is essentially true at the low inlet pressure (i.e., on the order of 1 psig) used in the present invention, solving for the pressure between orifices, yields the following relationship, $$P_2 = (P_s A_1{}^2 + P_q A_2{}^2)/(A_1{}^2 + A_2{}^2) \qquad 4$$

Differentiating with respect to the variable orifice area ($A_2$) yields the following formula, $$dP_2/dA_2 = 2P_q A_2/A_1{}^2 + A_2{}^2 - [(P_s A_1{}^2 + P_q A_2{}^2)(2A_2)]/(A_1{}^2 + A_2{}^2)^2 \qquad (5)$$

It should be noted that this formula applies to the change in back pressure in one of the two nozzles 30 or 31 only, so that the total $\Delta P$ across both nozzles 30 and 31 is the sum of the individual pressure changes of the two sides. Depending on the direction of rotation, as the back pressure in one nozzle increases, there is a corresponding decrease of pressure in the other nozzle.

A manifold 24 envelops a first end of shaft 19 adjacent plate 23 and is attached to cover 21 by appropriate means at mounting holes 40. Shaft 19 is retained from axial movement within cover 21 by a retaining ring 25 disposed at the first end of shaft 19, bearing against manifold 24 within a recess 37. Fluid enters manifold 24 through a supply port 26 communicating with a chamber 27 connected through a pair of equally flow restrictive fixed orifices 28 and 29 to a pair of fixed, diametrically opposite nozzles 30 and 31 of square cross-sectional area and orthogonal to chamber 27. Nozzles 30 and 31 are symmetrical about the centerline of shaft 19 and are formed to register with groove 23a, as will be more fully discussed. The surfaces of plate 23 and manifold 24 are in close proximity to each other and must be machined to a smooth finish and be parallel at all points to minimize leakage between them from nozzles 30 and 31. A pair of passageways 32 and 33 extend transversely from nozzles 30 and 31 and communicate with a pair of outlet ports 34 and 35 through bores 38 and 39 for measurement of the differential pressure therebetween. An O-ring 36 on shaft 19 bears against the inside diameter of manifold 24 to prevent any leakage of fluid past shaft 19.

Referring now to FIGS. 3, 4 and 5, operation of transducer 10 will be summarized. The fluid utilized in the present invention may be a gas, such as pressurized air or nitrogen, or a liquid such as water or oil. Gaseous nitrogen is preferably for weight and logistic purposes. Fluid, under laminar flow conditions, on the order of 1 psig constant pressure is introduced into supply port 26. Shaft 19 is rotated to a zero or null position such that groove 23a covers an equal portion (one half) of nozzles 30 and 31. At this position pressure partially vents to atmosphere from nozzles 30 and 31 through relief holes 23b and vents 22. Pressure is equal in nozzles 30 and 31 and pressure differential measured between ports 34 and 35 is zero corresponding to the zero degree position in FIG. 5. Referring now to FIGS. 3 and 4, nozzle 30 is shown aligned with groove 23a and one of the relief holes 23b, plate 23 having been rotated 90° counterclockwise from the zero degree position. Flow through nozzle 31 is blocked by the surface of plate 23, with groove 23a offset as a result of its asymmetric disposition from the center of plate 23. At this angular position pressure in nozzle 30 vents to atmosphere through relief holes 23b and vents 22 and is essentially zero at port 34, while back pressure in nozzle 31 is static and is essentially equal to the supply pressure. This condition is illustrated in FIG. 5 by one of the maximum amplitude points at (−)90°. It should be noted that as shaft 19 is rotated from the zero degree position counterclockwise, back pressure in nozzle 31 linearly increases with a corresponding linear decrease in pressure in nozzle 30. Maximum amplitude at (+)90° is obtained by rotating shaft 19 in the clockwise direction from the zero position until nozzle 31 is fully aligned with groove 23a and one of the relief holes 23b allowing venting. Nozzle 30 is now blocked by the face of plate 23 causing back pressure to build up to the supply pressure. Pressure vs. shaft rotation between zero degrees and ±90° is linear and thus a calibration of intermediate shaft positions is readily obtained. Counterclockwise rotation of shaft 19 from the (−)90° position and, correspondingly, clockwise rotation from the (+)90° position brings shaft 19 back to the zero or null position. This is illustrated in FIG. 5 by (−)180° and (+)180°. Pressure vs. shaft rotation is linear throughout this range allowing accurate calibration.

Some of the many advantages of the present invention should now be apparent. The sensor described herein is compact, lightweight, utilizes low supply pressure in the laminar fluidic range, has a full 360° measurement range, a linear output, and uniform resolution.

It should be understood that the foregoing disclosure relates to only one embodiment of the present invention, and that numerous modifications and variations may be made therein without departing from the spirit and scope of the invention as set forth in the appended claims.

What is claimed is:

1. A fluidic device for sensing angular position of a shaft over a complete revolution comprising:

fluid flow means having a central axis therethrough, a first opening for receiving pressurized fluid, a pair of nozzles equidistantly and diametrically oppositely positioned from the central axis each having an opening of fixed radial width in a plane normal thereto, a pair of fixed orifices connected between said first opening and said nozzles forming respective passages and for restricting fluid flow therethrough, and second and third openings communicating with said passages for connecting to a pressure differential sensing means;

pressure modulating means including a spindle having one end extending through said fluid flow means along the central axis and the other end formed to coaxially connect to the shaft for rotation therewith, and a circular plate coaxially fixed to said spindle having a planar surface perpendicular thereto and juxtapositioned adjacent the outlets of said nozzles, said plate further having a continuous groove in said surface around the central axis of uniform width and depth and an opening communicating between said groove and the ambient environment, said groove having an outer edge traversing in opposite directions the radial widths of said nozzles in one-half of a revolution in either direction;

retaining means operatively connected between the one end of said spindle and said fluid flow means for rotatingly securing said spindle thereto; and fluid sealing means disposed between the exterior surface of said spindle and the interior surface of said fluid flow means for preventing fluid from leaking therepast;

whereby a differential back pressure of the pressurized fluid at said second and third openings produced by the relative position of said groove outer edge with respect to said nozzles is linearly indicative of the angular position of the shaft.

2. A fluidic device as set forth in claim 1 wherein: said groove being formed according to the relationship $dP_2/dA_2 = 2P_qA_2/A_1^2+A_2^2 - [(P_sA_1^2 + P_qA_2^2)(2A_2)]/(A_1^2+A_2^2)^2$ where $P_2$ = Modulated pressure in one of said passages,
$P_q$ = Ambient pressure,
$P_s$ = Supply pressure,
$A_1$ = Area of one of said fixed orifices, and
$A_2$ = Area of opening at one of said nozzles, whereby a linear pressure differential is obtained at said second and third openings.

* * * * *